United States Patent
Coronado et al.

(10) Patent No.: US 8,910,321 B2
(45) Date of Patent: Dec. 16, 2014

(54) UNIVERSAL FLANGE APPARATUS FOR PLUMBING FIXTURES

(75) Inventors: Eduardo Coronado, San Pedro Garza Garcia (MX); Humberto Flores-Villarreal, San Nicolas de los Garza (MX); Jorge Sada, San Pedro Garza Garcia (MX); Evodio Ortiz, Sta. Catarina (MX)

(73) Assignee: Coflex S.A. de C.V. (MX)

( * ) Notice: Subject to any disclaimer, the term of this patent is extended or adjusted under 35 U.S.C. 154(b) by 950 days.

(21) Appl. No.: 12/574,566

(22) Filed: Oct. 6, 2009

(65) Prior Publication Data

US 2010/0088811 A1   Apr. 15, 2010

Related U.S. Application Data

(60) Provisional application No. 61/103,131, filed on Oct. 6, 2008.

(51) Int. Cl.

| E03D 11/16 | (2006.01) |
|---|---|
| E03D 11/14 | (2006.01) |
| E03D 11/00 | (2006.01) |
| F16L 27/10 | (2006.01) |
| F16L 27/108 | (2006.01) |

(52) U.S. Cl.
CPC ............. *E03D 11/14* (2013.01); *F16L 27/1012* (2013.01); *F16L 27/108* (2013.01)
USPC ............... 4/252.4; 4/252.2; 4/252.3; 4/252.5; 285/58

(58) Field of Classification Search
CPC .......... E03D 13/00; E03D 11/14; E03D 11/16
USPC .................. 4/252.1–252.6; 285/40, 342, 368; 277/626
See application file for complete search history.

(56) References Cited

U.S. PATENT DOCUMENTS

| 961,685 | A | * | 6/1910 | Cosgrove ....................... 4/252.1 |
|---|---|---|---|---|
| 2,743,460 | A | | 5/1956 | Youngstrom et al. |
| 3,727,955 | A | * | 4/1973 | Carter ............................ 285/223 |
| 3,891,007 | A | * | 6/1975 | Kleykamp ..................... 138/121 |
| 4,185,334 | A | * | 1/1980 | Izzi ................................ 4/252.2 |
| 4,355,828 | A | * | 10/1982 | Taunton ........................ 285/342 |
| 4,445,237 | A | | 5/1984 | Paul |
| 4,516,278 | A | * | 5/1985 | Lamond ............................ 4/679 |
| 6,719,294 | B2 | * | 4/2004 | Nguyen et al. ................ 277/314 |

(Continued)

OTHER PUBLICATIONS

Applicants Admitted prior art, Fig. 1a of the instant application.*

*Primary Examiner* — Huyen Le
*Assistant Examiner* — Christine Skubinna
(74) *Attorney, Agent, or Firm* — Baker & McKenzie LLP (57) ABSTRACT

A flange apparatus operable to connect the discharge of a plumbing fixture to the waste drain pipe of a drainage system. In an embodiment, the flange apparatus includes a flange and a flexible sleeve disposed through a central opening of the flange, in which a first portion of the flexible sleeve is seated on the flange. The flange further includes arm portions, each having an aperture defined therethrough. The surfaces of the apertures are substantially smooth, and the apertures are operable to receive fasteners. In an embodiment, the arm portions may be made of threadable materials, and the fasteners may have thread-forming fasteners such that threads are formed in the arm portions when the thread-forming fastener is received in the aperture of the arm portions.

25 Claims, 10 Drawing Sheets

(56) References Cited

U.S. PATENT DOCUMENTS

| | | |
|---|---|---|
| 6,764,263 B2 * | 7/2004 | Carlo .............................. 411/386 |
| 7,188,376 B2 * | 3/2007 | Ortiz et al. ..................... 4/252.5 |
| 7,814,580 B2 * | 10/2010 | Coronado et al. ............. 4/252.6 |
| 2005/0278841 A1 * | 12/2005 | Coronado et al. ............. 4/252.5 |
| 2006/0145428 A1 * | 7/2006 | Dudman ....................... 277/626 |

* cited by examiner

UNIVERSAL FLANGE APPARATUS FOR PLUMBING FIXTURES

CROSS-REFERENCE TO RELATED APPLICATION

This application claims priority to U.S. Provisional. App. Ser. No. 61/103,131 filed on Oct. 6, 2008, which is hereby incorporated by reference in its entirety for all purposes.

TECHNICAL FIELD

The present disclosure generally relates to flanges, and more particularly to flanges for connecting plumbing fixtures of various sizes to a drainage system.

BACKGROUND

Today, a wide variety of plumbing fixtures are commercially available, and the dimensions of the plumbing fixtures can vary widely. Various flange apparatus have been used in the installation of plumbing fixtures to connect and secure the plumbing fixture to the drainage system of a building. For example, a flange is often used to connect the discharge of wall-mounted urinals to the waste drain pipe within or behind the wall. To accommodate the varying dimensions of the plumbing fixtures, flanges of various dimensions have been made available.

BRIEF SUMMARY

One embodiment of the present disclosure is directed to a flange apparatus for connecting a plumbing fixture to a drain pipe of a drainage system. The flange apparatus comprises a flange comprising a central portion and arm portions extending from the central portion, wherein the central portion comprises a central opening defined therethrough, and the arm portions each comprise an aperture defined therethrough, the aperture comprising substantially smooth surfaces and being operable to receive a fastener. The flange apparatus further comprises a flexible sleeve disposed through the central opening of the flange, the flexible sleeve comprising a first end portion mounted on an upper surface of the central portion of the flange. The first end portion comprises a ring protruding from a surface of the first end portion, the ring being operable to provide a seal between the flexible sleeve and the plumbing fixture.

Another embodiment of the present disclosure is directed to a flange apparatus for connecting a plumbing fixture to a drain pipe of a drainage system. The flange apparatus comprises a flange comprising a central portion and arm portions extending from the central portion, wherein the central portion comprises a central opening defined therethrough, and the arm portions each comprise an aperture defined therethrough, the aperture comprising substantially smooth surfaces and being operable to receive a thread-forming fastener. The flange apparatus further comprises a flexible sleeve disposed through the central opening of the flange, the flexible sleeve comprising a first end portion mounted on an upper surface of the central portion of the flange. The first end portion comprises a ring protruding from a surface of the first end portion, the ring being operable to provide a seal between the flexible sleeve and the plumbing fixture. Furthermore, the arm portions are made of a threadable material such that threads are formed in the arm portions when the thread-forming fastener is received in the aperture of the arm portions.

Yet another embodiment of the present disclosure is directed to a method for connecting a plumbing fixture discharge to a waste drain pipe. The method comprises providing a flange comprising a central portion and arm portions extending from the central portion, wherein the central portion comprises a central opening defined therethrough, and the arm portions each comprise an aperture defined therethrough, the aperture comprising substantially smooth surfaces. The method further comprises providing a flexible sleeve comprising first and second end portions, wherein the first end portion comprises a ring protruding from a surface of the first end portion, the ring being operable to provide a seal between the flexible sleeve and the plumbing fixture. The method further comprises seating the first end portion on a upper surface of the central portion of the flange and disposing the second end portion of the flexible sleeve through the central opening of the flange. The method further comprises connecting the second end portion of the flexible sleeve to the waste drain pipe. The method further comprises inserting fasteners through holes defined in the plumbing fixture and into the apertures of the arm portions of the flange, thereby connecting the first end portion of the sleeve to the plumbing fixture discharge.

BRIEF DESCRIPTION OF THE DRAWINGS

Embodiments are illustrated by way of example in the accompanying figures, in which like reference numbers indicate similar parts, and in which:

FIG. 1b is a perspective view of the flange apparatus shown in FIG. 1a;

FIG. 5b is a cut-away perspective view of the flange apparatus shown in FIG. 5a;

DESCRIPTION

Various aspects of a flexible flange and related methods for installing a flexible flange according to the present disclosure are described. It is to be understood, however, that the following explanation is merely exemplary in describing the devices and methods of the present disclosure. Accordingly, several modifications, changes and substitutions are contemplated.

Figure 1A:
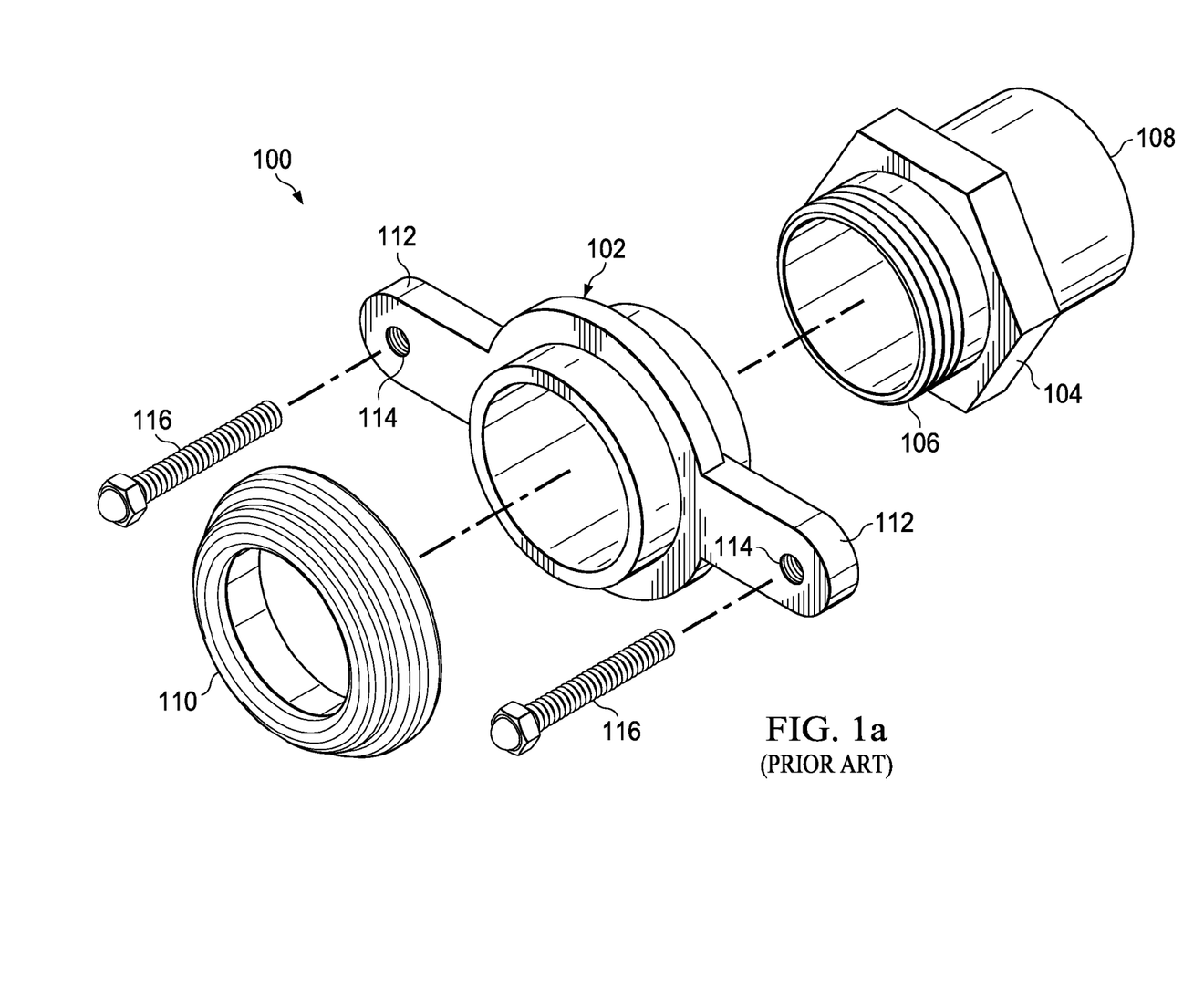
FIG. 1a is an exploded perspective view of a conventional flange apparatus.
Figure 1B:
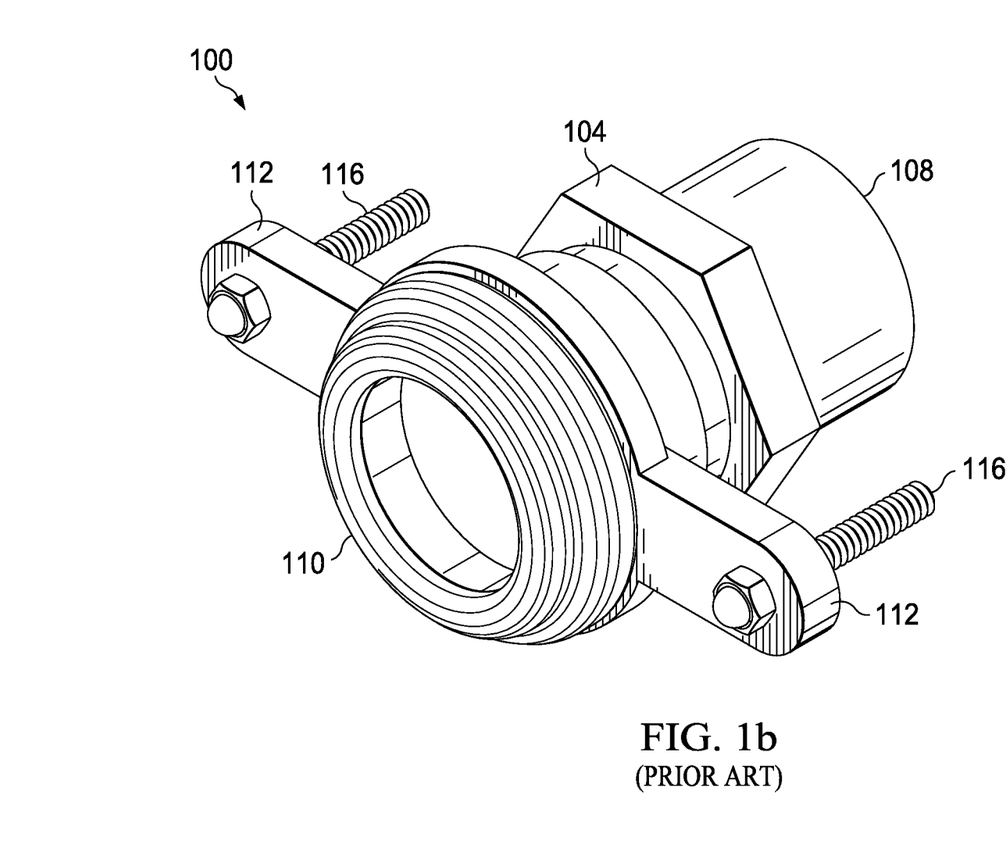

FIG. 1a is an exploded perspective view of a conventional flange apparatus 100 and FIG. 1b is a perspective view of the conventional flange apparatus shown in FIG. 1a. Conventional rigid flange apparatus 100 is operable to connect the discharge of a urinal (not shown) to the drainage system (not shown) of a building. The conventional rigid flange apparatus 100 includes a flange 102 that is made of a rigid material. For example, the flange 102 may be made of brass or rigid polymeric materials. Coupled to a first side of the flange 102 is a rigid connector 104 made of a rigid material. The rigid connector 104 has a first externally-threaded end portion 106 for coupling to the flange 102 and a second end portion 108 for providing a connection to the drain pipe. A gasket 110 is disposed on a second side of the flange 102 to provide a seal between discharge of the urinal and the flange 102. The flange 102 includes arm portions 112 that extend outwardly, and the arm portions 112 each have at least one threaded bore 114. To install the rigid flange apparatus 100 onto the urinal, screws 116 are inserted through openings (not shown) in the urinal and received by the threaded bores 114.

Figure 2:
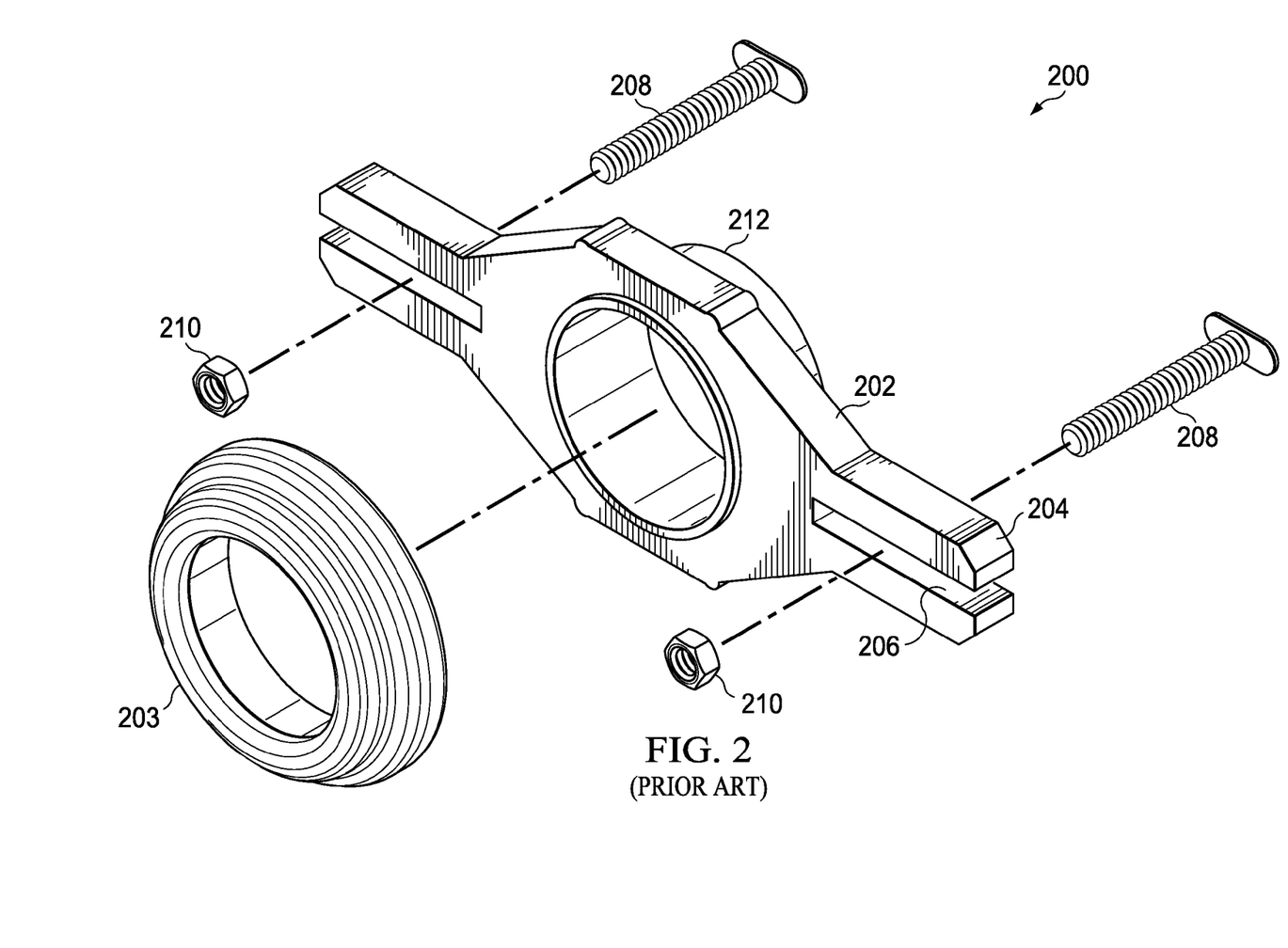
FIG. 2 is an exploded view of another conventional flange apparatus.

FIG. 2 illustrates another conventional rigid flange apparatus 200, which includes a flange 202 and a gasket 203. The flange 202 comprises outwardly extending arm portions 204 and a rigid body portion 212. Arm portions 204 of the flange 202 each comprise a slit 206 instead of a threaded bore, and screws 208 are inserted through the slits 206. To secure the flange apparatus 200 to a urinal (not shown), the gasket 203 is first disposed on a top surface of the flange 202, and the screws 208 are then inserted through both the slits 206 and the corresponding bores (not shown) in the urinal from a first side of the urinal. Nuts 210 are disposed over the screws 208 on a second side of the urinal to tightly secure the flange 202 to the urinal. Washers may be disposed between the head of the screws 208 and the flange 202 and between the nuts 210 and the urinal. Nuts 210 are used to secure the screws 208 because the slits 206 are not threaded.

Due to the rigidity of the conventional flange apparatuses 100 and 200, the installation of the urinal requires precise alignment of the urinal, the flange apparatus, and the drainage pipe in the drainage system. But the precision required is impractical due to various sources of misalignment. For example, the drainage pipe in the drainage system could have various degrees of inclination, or there may be height adjustment errors inherent in the fixing of the urinal to the wall.

Furthermore, urinals made by different manufacturers may have different shape and form, thus requiring flange apparatuses of different sizes for each respective installation job. For example, the flange apparatus 100 comprises threaded bores 114 for receiving screws 116 that are disposed through corresponding openings in the urinal. The threaded bores 114 are spaced apart by a fixed distance. As such, the flange apparatus 100 can only accommodate urinals whose corresponding openings are spaced apart by the same distance. A different flange apparatus of a different size would have to be obtained for urinals not having matching dimensions. While the flange apparatus 200 is configured to have slits 206 to provide some accommodation for the different distances between the openings in the urinal for receiving the screws 208, the use of washers and nuts 210 is cumbersome and increases the difficulty of installation.

Another disadvantage of the conventional rigid flange apparatus 100 and 200 is the additional sources of leakage that may result from connecting multiple parts to form a conduit between the urinal and the drainage system. As illustrated in FIGS. 1(a), 1(b), connecting a gasket 110, a flange 102, and a connector 104 presents two additional sources of leakage between the urinal and the drainage system. Connecting the gasket 203 and the flange 202 as shown in FIG. 2 presents an additional source of leakage.

Accordingly, the following described embodiments and their variants within the scope of this disclosure provides advantages that overcome these conventional apparatuses 100 and 200.

Figure 3A:
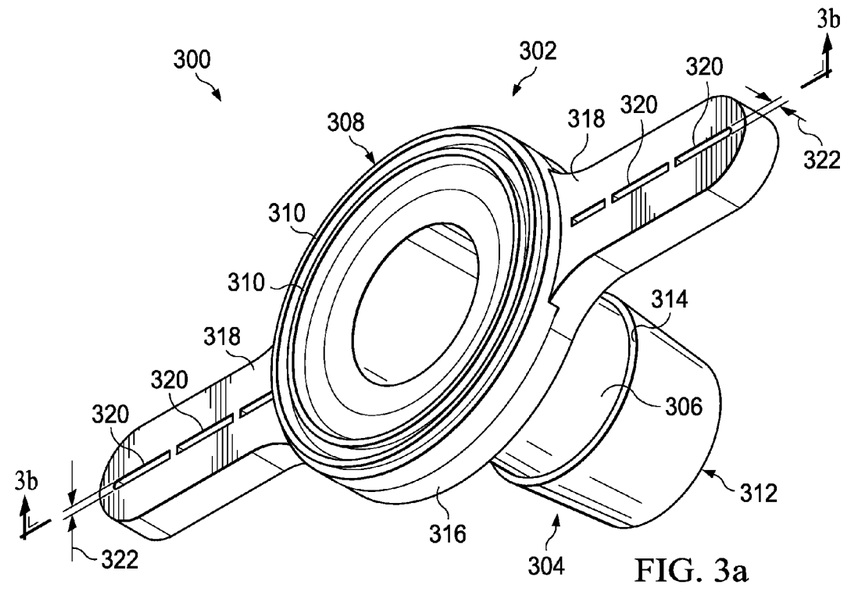
FIG. 3a is a perspective view of one embodiment of a flexible flange apparatus according to the present disclosure.
Figure 3B:
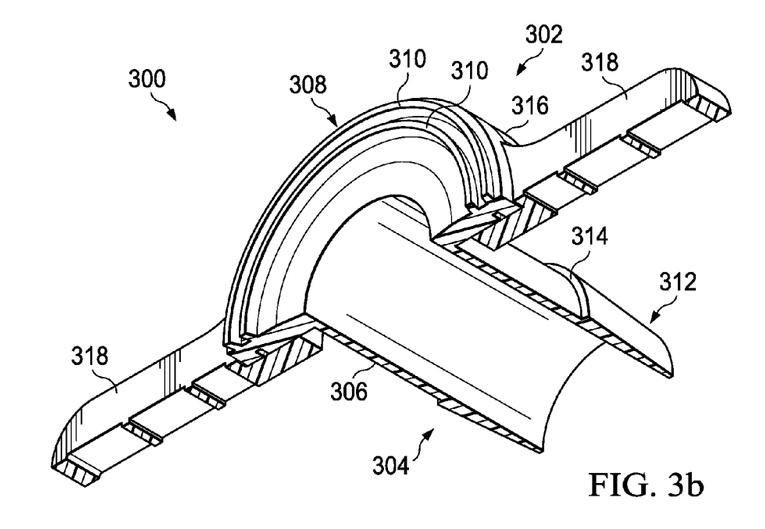
FIG. 3b is a cut-away view of the flexible flange apparatus shown in FIG. 3a according to the present disclosure.
Figure 3C:
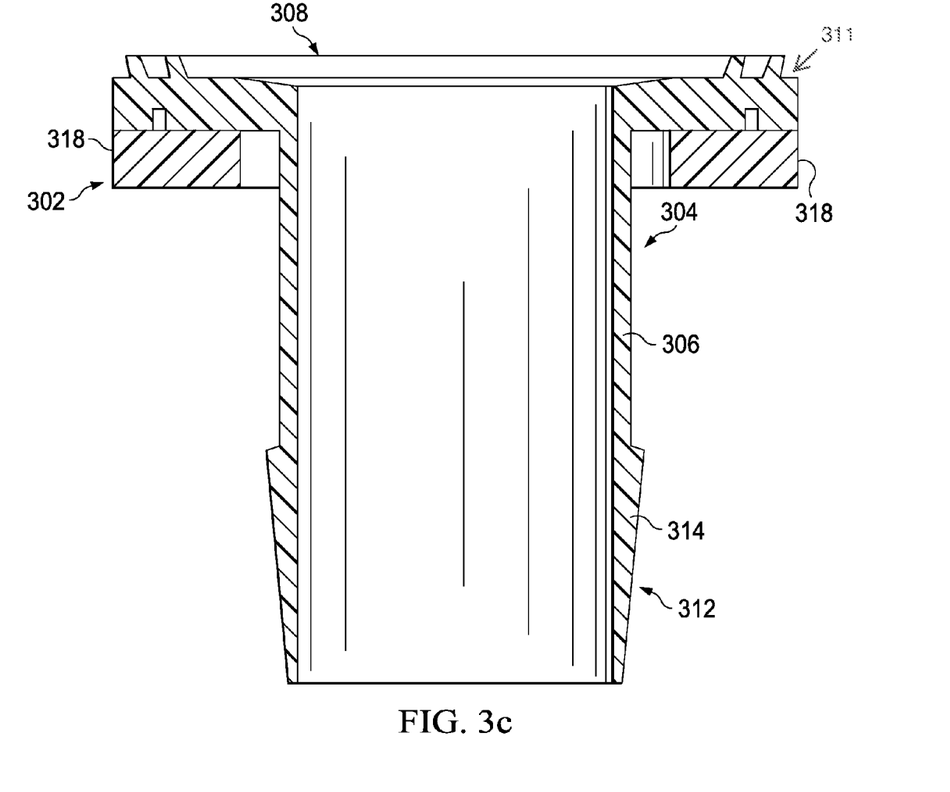
FIG. 3c is a cross-sectional view of the flexible flange apparatus shown in FIG. 3a according to the present disclosure.

FIG. 3a is a perspective view of one embodiment of a flexible flange apparatus 300. FIG. 3b is a cut-away view of the flexible flange apparatus 300, and FIG. 3c is a cross-sectional view of the flexible flange apparatus 300. The flexible flange apparatus 300 includes a flange 302 comprising a central opening and a flexible sleeve 304 mounted on the flange 302, in which the body 306 of the flexible sleeve 304 extends through the central opening of the flange 302. The flange 302 and the flexible sleeve 304 may be integrally formed or removably coupled. In one embodiment, the flexible sleeve is seated on a recessed area defined in the flange 302. The recess area may be defined, in part, by a central portion 316 and arm portions 318 of the flange 302, with the upper surface of the arm portions 318 being elevated relative to an upper surface of the central portion 316. Such a recessed area allows the flexible sleeve 304 to be securely mounted on the flange 302. Additional descriptions of the central and arm portions 316 and 318 are provided in a later portion of the present disclosure. In another embodiment, the diameter of the recessed area may be substantially the same as the outer diameter of a first end portion 308 of the flexible sleeve 304.

The sleeve 304 includes a first end portion 308 comprising at least one concentric ring 310. In one embodiment, the sleeve 304 comprises a plurality of concentric rings 310. The concentric rings 310 may include members protruding upwardly from the top surface of the end portion 308 and forming a plurality of concentric rings operable to provide a substantially sealed connection between the discharge of a urinal and the sleeve 304. It will be appreciated that the substantially sealed connection may also be provided in other ways, such as by providing a gasket (e.g., the gasket 110) at the surface 311. An inner wall of the sleeve 304 in a longitudinal direction may be generally linear (i.e., without corrugations). The sleeve 304 further includes a second end portion 312 having a sealing element 314 on the outer surface of the sleeve 304, and the sealing element 314 is operable to substantially seal the connection between the sleeve 304 and the drain pipe of the drainage system.

Figure 4A:
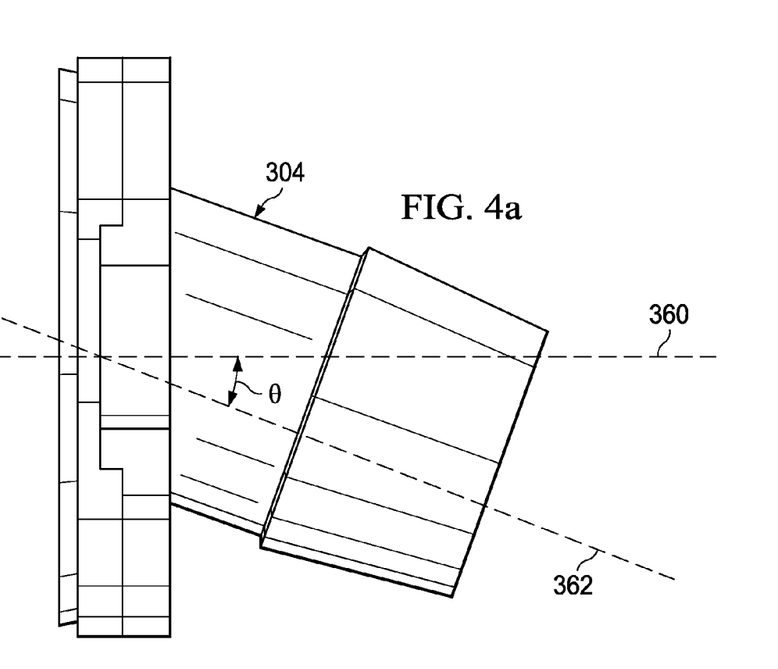
FIG. 4a is a side view of an embodiment of the flange apparatus according to the present disclosure.

FIG. 4a is a side view of an embodiment of a flexible flange apparatus 400, showing a perspective view of the flexible sleeve 304, which is made of a substantially flexible material that allows it to be distorted during installation. The flexible sleeve 304 may in some installations have a non-distorted longitudinal axis 360, and in other installations, have be angularly distorted, such that the flexible sleeve 304 has a distorted longitudinal axis 362. The body 306 of the sleeve 304 is sufficiently flexible to achieve non-negligible angles of deflection θ relative to a non-distorted longitudinal axis 360. In one example, a non-negligible angle of deflection θ may be ten degrees or more of deflection of one end of the sleeve 304 relative to an opposing end of the sleeve 304 as illustrated in FIG. 4(a).

Figure 4B:
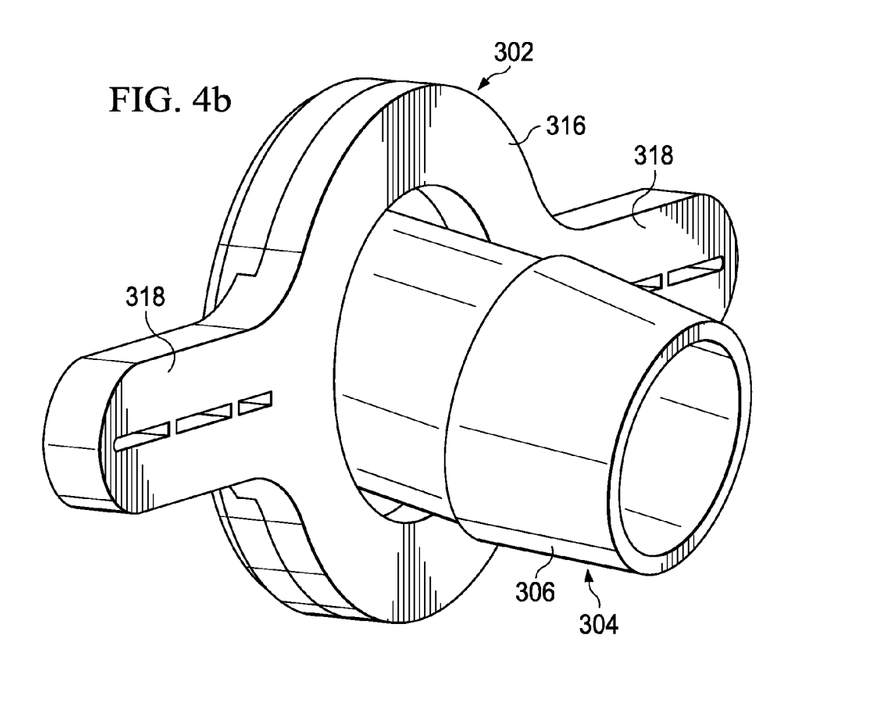
FIG. 4b is a perspective view of the flange apparatus shown in FIG. 4a, according to the present disclosure.

FIG. 4(b) is a perspective view of the distorted sleeve 304 shown in FIG. 4(a). The sleeve 304 may be formed of various materials to permit non-negligible flexibility. For example, the sleeve 304 may be formed of materials having a hardness ranging from 35 shore A to 90 shore A, or from 35 shore A to 65 shore A, or more specifically about 50 shore A. The sleeve 304 may be formed of uniform material that would lead to a reduction in manufacturing costs and the likelihood of error during installation. Also, the sleeve 304 may be of any suitable length. In a preferred embodiment, the sleeve 304 is 2-4 inches in length.

Referring back to FIGS. 3(a)-3(c), the flange 302 of the flexible flange apparatus 300 includes a central portion 316 and arm portions 318 extending from the central portion 316. The arm portions 318 include apertures 320 that are operable to receive fasteners (not shown). The surfaces of the apertures 320 are substantially smooth and are not threaded, and the fasteners can be received anywhere along the apertures 320. The apertures 320 comprise elongated apertures extending along the length of the arm portions 318. In some embodiments, the width 322 of the apertures 320 is smaller than the diameter of the fasteners, but the arm portions 318 are made of a material that can be deformed to accommodate the fasteners being inserted into the aperture 320. In an exemplary embodiment, the arm portions 318 are made of a threadable material that can be threaded with a thread-forming fastener without the use of a drill bit. Examples of a suitable threadable material include thermoplastic materials (e.g., polyvinyl chloride ("PVC") or acrylonitrile butadiene styrene ("ABS")), and arm portions 318 may be made of the same or different materials. Suitable fasteners include various threaded screws known in the art, and the insertion of the threaded screws may be accomplished by drilling the threaded screws through the apertures 320. In another embodiment, the fasteners may comprise unthreaded nails, and the insertion of the nails may be accomplished by forcibly punching the nail into the narrower aperture 320 using a hammer. It is to be appreciated that apertures 320 guide and facilitate the drilling of the screws, and the fasteners can be inserted anywhere along the apertures 320. It is to be further appreciated that the nails and the arm portions may be modified to include a lock-and-release mechanism to prevent the nails from loosening over time and still allow the removal of the nails when the urinal needs to be removed from the wall. In one exemplary embodiment, the nails and the arm portions may cooperate to form a releasable ratchet mechanism that will allow the nails to be inserted but not loosen unless the ratchet is released.

Figure 5A:
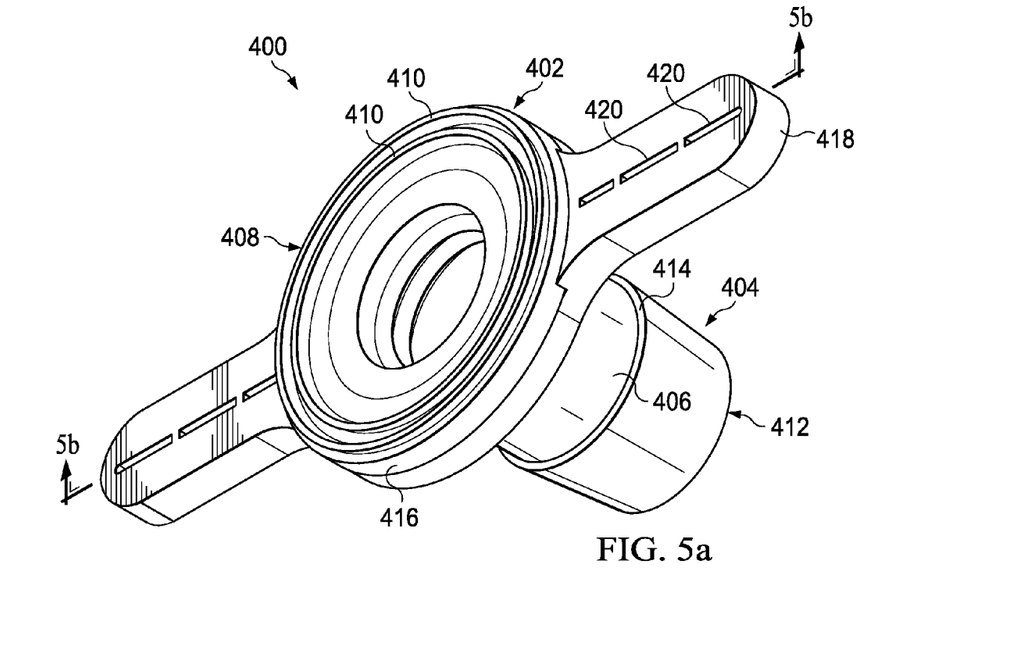
FIG. 5a is a perspective view of another embodiment of the flange apparatus according to the present disclosure.
Figure 5B:
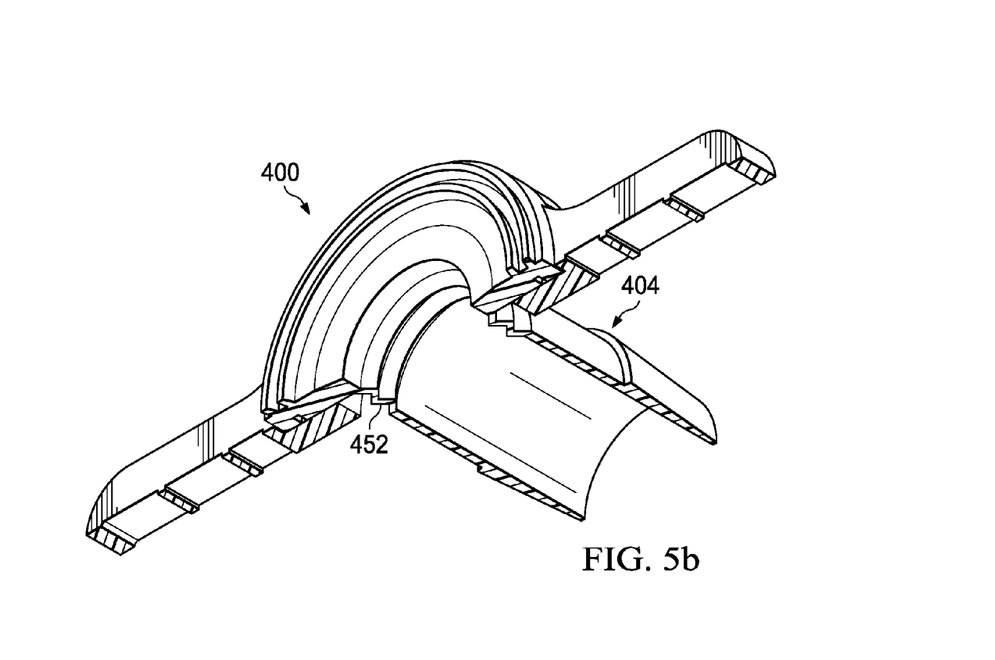

The flexible flange apparatus 300 can be modified according to the principles disclosed herein to achieve various desired design needs. For instance, another exemplary embodiment of the flexible flange apparatus of the present disclosure is provided with reference to FIGS. 5(a) and (b).

The illustrated embodiment comprises a flexible flange apparatus 450, which includes a flange 402 comprising a central opening and a flexible sleeve 404 mounted on the flange 402, in which the body 406 of the flexible sleeve 404 extends through the central opening of the flange 402. The flexible sleeve 404 may be made of any flexible material discussed in the present disclosure, and additionally, the body 406 may include a corrugated portion 452 to improve the flexibility of the sleeve 404. The sleeve 404 may include a first end portion 408 having at least one concentric ring 410. In an embodiment, the sleeve 404 may include a plurality of concentric rings 410 comprising a member protruding upwardly from the top surface of the end portion 408 and forming a plurality of concentric rings. The sleeve 404 may further include a second end portion 412 having a sealing element 414 on the outer surface of the sleeve 404. The flange 402 of the flexible flange apparatus 450 may include a central portion 416 and arm portions 418 extending from the central portion 416. The arm portions 418 may include apertures 420 that are operable to receive fasteners, such as nails or threaded screws (not shown).

Figure 6A:
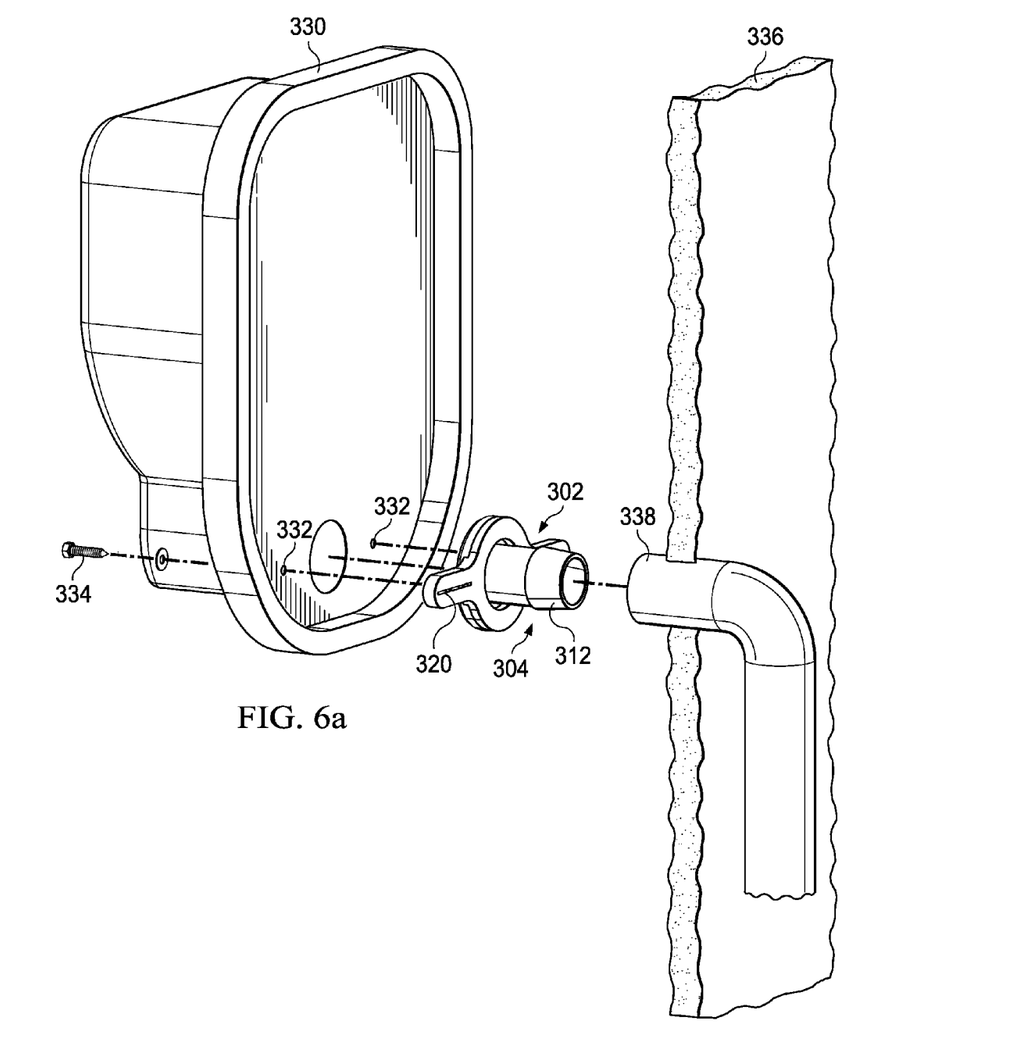
FIG. 6a is an exploded view of a plumbing fixture installation comprising the flange apparatus of the present disclosure.
Figure 6B:
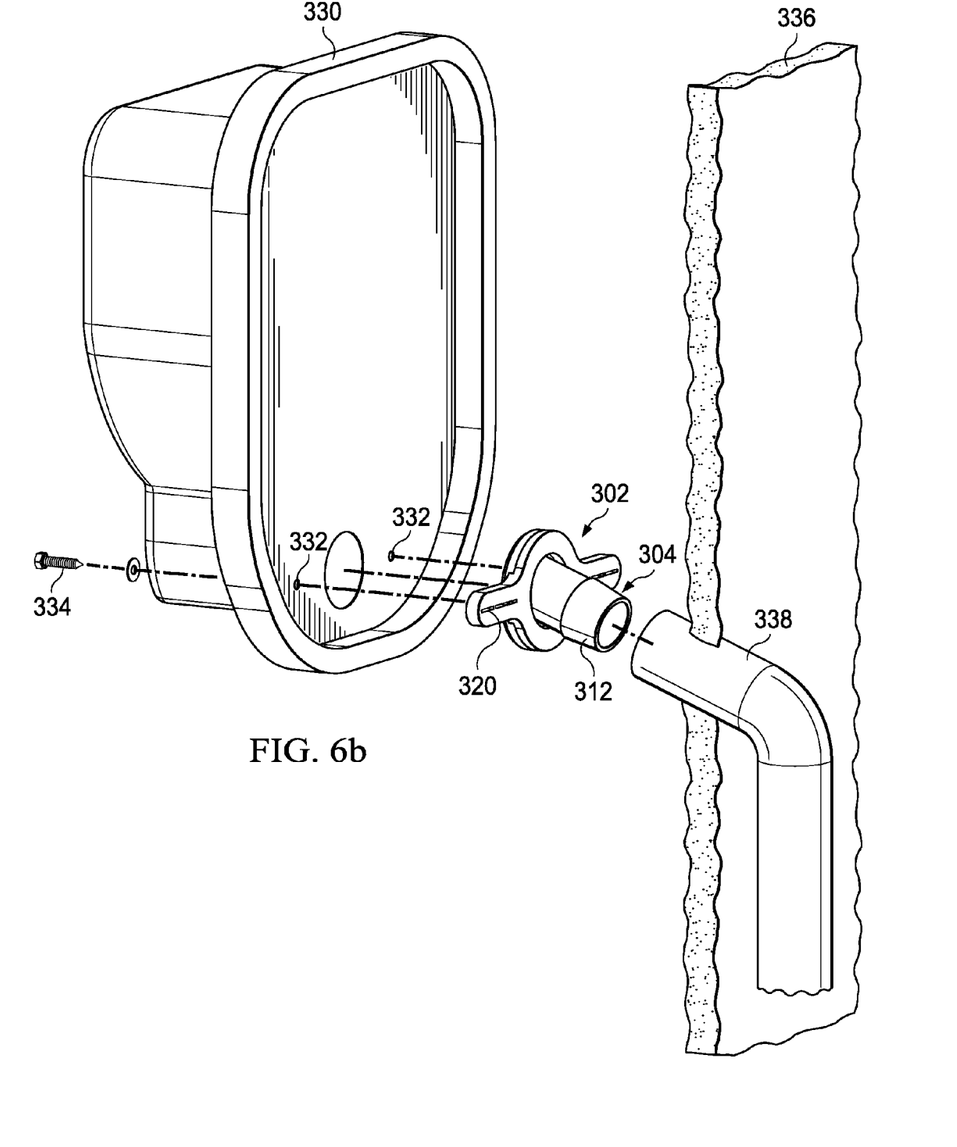
FIG. 6b is an exploded view of another plumbing fixture installation comprising the flange apparatus of the present disclosure.
Figure 7:
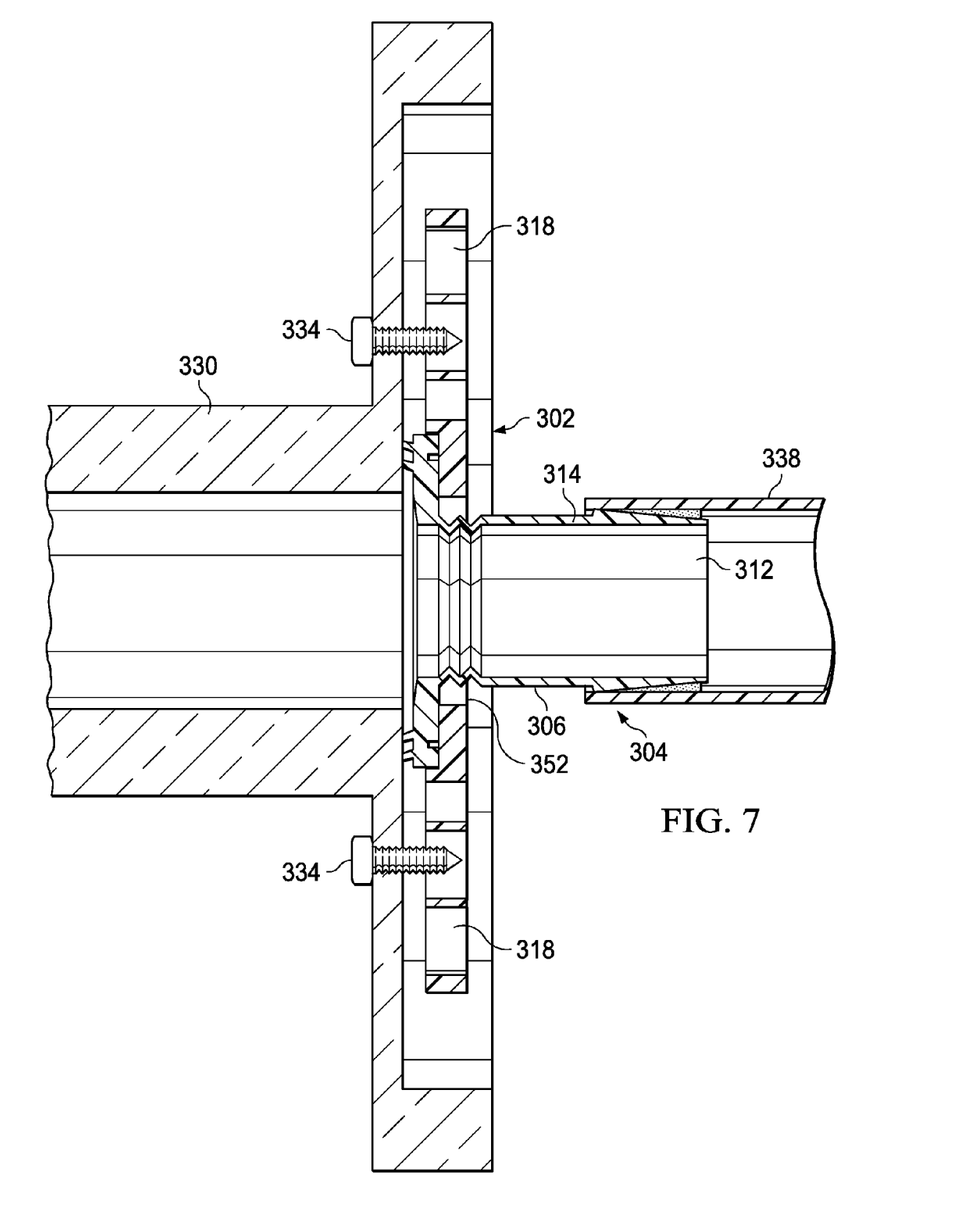
FIG. 7 is a cross-section view of a flange apparatus coupled to a plumbing fixture, in accordance with the present disclosure.

Turning to FIGS. 6(a), 6(b), and 7, the installation of the urinal 330 generally involves connecting the second end portion 312 of the flexible flange apparatus 300 or 400 to the drain pipe 338, mounting the urinal 330 on the wall 336, and connecting the first end portion 308 of the flange apparatus 300 to the urinal 330. As described above, the discharge of urinal 330 and the drain pipe 338 often do not align properly due to human errors in the mounting of the urinal 330 and the inclination of the drain pipe 338. In this regard, the flexibility of the sleeve 304 allows the second end portion 312 to be adjusted to a variety of orientations relative to the first end portion 308 to accommodate for the misalignment of the urinal 330 and drain pipe 338. For example, the sleeve 304 can be bent at an angle to accommodate for the inclination of the drain pipe 338 as illustrated in FIG. 6(b). It is also to be appreciated that the flexibility of the sleeve 304 reduces the number of potential sources of leakage by eliminating the need for additional connectors to accommodate the misalignment between a flange apparatus and the drain pipe. For example, rather than disposing a gasket between the urinal and a flange, the flexible sleeve 304 provides one continuous leak-proof conduit from the urinal to the plumbing system of the building. It should also be appreciated that the flexibility of the sleeve 304 also allows for some freedom of movement caused by the varying and unequal expansion and contraction of different materials through a range of temperatures.

In the last step of the installation, the urinal 330 and the flange apparatus 300 are connected using screws 334. The screws 334 may be thread-forming screws known in the art that are operable to be drilled through a medium. In some embodiments, the screws 334 each have a pointed tip as shown in FIGS. 6(a), 6(b), and 7 to facilitate the drilling. The urinal 330 has two bores 332 that allow the screws 334 to be inserted through the urinal 330 and drilled through the apertures 320 into the arm portions of the flange 302. As the screws are tightened, the flange 302 presses the concentric rings 310 tightly against the discharge of the urinal, thereby forming a substantially sealed connection. The concentric rings 310 thus eliminate the need for an additional part—a gasket—to seal the flange-urinal connection, which would be a source of leakage if present. It is also to be appreciated that since the screws 334 can be received anywhere along the apertures 320, the flexible flange apparatus 300 can be connected to urinals that were made by different manufacturers and have different separations between the bores 332.

It should be appreciated that the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A flange apparatus for connecting a plumbing fixture to a drain pipe of a drainage system, the flange apparatus comprising:
   a fastener;
   a flange comprising a central portion and arm portions extending from the central portion, the arm portions being made of a threadable material that forms threads when the fastener is driven into the threadable material, wherein
      the central portion comprises a central opening defined therethrough,
      the arm portions each comprise a plurality of apertures defined therethrough,
      the plurality of apertures are elongated apertures each having an axis along the elongation of the aperture extending along a common axis in a lengthwise direction of the respective arm portion,
      each aperture is enclosed by the respective arm portion,
      the plurality of apertures are respectively operable to receive the fastener, and
      a width of each aperture is smaller than a width of the fastener; and
   a flexible sleeve disposed through the central opening of the flange, the flexible sleeve comprising
      a first end portion including an outwardly extending annular element mounted on an upper surface of the central portion of the flange, and
      a sealing element, wherein
   an inner wall of the flexible sleeve is generally linear from the outwardly extending annular element to a terminal end of a second end portion.

2. The flange apparatus of claim 1, wherein the aperture comprises substantially smooth surfaces.

3. The flange apparatus of claim 1, wherein the fastener comprises a thread-forming screw, the screw comprising a cylindrical body of a first diameter, and further wherein the width of each aperture is smaller than the first diameter.

4. The flange apparatus of claim 1, wherein the fastener comprises an unthreaded nail, the nail comprising a cylindrical body of a first diameter, and further wherein the width of each aperture is smaller than the first diameter.

5. The flange apparatus of claim 1, wherein upper surfaces of the arm portions of the flange are elevated relative to the upper surface of the central portion, thereby defining a recessed area, and the first end portion of the flexible sleeve is disposed within the recessed area.

6. The flange apparatus of claim 1, wherein the sealing element is disposed about the second end portion of the flexible sleeve.

7. The flange apparatus of claim 1, wherein the flexible sleeve is integrally formed with the flange.

8. The flange apparatus of claim 1, wherein the flexible sleeve is removably connected with the flange.

9. The flange apparatus of claim 1, wherein the flexible sleeve is capable of at least 10 degrees of deflection.

10. The flange apparatus of claim 1, wherein the first end portion comprises a plurality of concentric rings protruding from a surface of the first end portion.

11. A flange apparatus for connecting a plumbing fixture to a drain pipe of a drainage system, the flange apparatus comprising:
   a thread-forming fastener;
   a flange comprising a central portion and arm portions extending from the central portion, the arm portions being made of a threadable material, wherein
      the central portion comprises a central opening defined therethrough,
      the arm portions each comprise plurality of apertures defined therethrough,
      the plurality of apertures are elongated apertures each having an axis along the elongation of the aperture extending along a common axis in a lengthwise direction of the respective arm portion,
      each aperture is enclosed by the respective arm portion,
      the plurality of apertures are respectively operable to receive the thread-forming fastener, and
      a width of each aperture is smaller than a width of the thread-forming fastener; and
   a flexible sleeve disposed through the central opening of the flange, the flexible sleeve comprising
      a first end portion including an outwardly extending annular element mounted on an upper surface of the central portion of the flange, and
      a sealing element, wherein
   an inner wall of the flexible sleeve is generally linear from the outwardly extending annular element to a terminal end of a second end portion, and
   the arm portions are made of a threadable material such that threads are formed in the arm portions when the thread-forming fastener is received in the aperture of the arm portions.

12. The flange apparatus of claim 11, wherein upper surfaces of the arm portions of the flange are elevated relative to the upper surface of the central portion, thereby defining a recessed area, and the first end portion of the flexible sleeve is disposed within the recessed area.

13. The flange apparatus of claim 11, wherein the sealing element is disposed about the second end portion of the flexible sleeve.

14. The flange apparatus of claim 11, wherein the first end portion comprises a plurality of concentric rings protruding from a surface of the first end portion.

15. A method for connecting a plumbing fixture discharge to a waste drain pipe, comprising:
   providing a plurality of fasteners;
   providing a flange comprising a central portion and arm portions extending from the central portion, the arm portions being made of a threadable material that forms threads when one of the fasteners is driven into the threadable material, wherein
      the central portion comprises a central opening defined therethrough,
      the arm portions each comprise a plurality of apertures defined therethrough,
      the plurality of apertures are elongated apertures each having an axis along the elongation of the aperture extending along a common axis in a lengthwise direction of the respective arm portion,
      each aperture is enclosed by the respective arm portion,
      the plurality of apertures are respectively operable to receive the fasteners, and a width of each aperture is smaller than a width of one of the fasteners;

providing a flexible sleeve comprising first and second end portions, an inner wall and a sealing element, the first end portion including an outwardly extending annular element, the inner wall being generally linear from the outwardly extending annular element to a terminal end of the second end portion;

seating the first end portion on a upper surface of the central portion of the flange;

disposing the second end portion of the flexible sleeve through the central opening of the flange;

connecting the second end portion of the flexible sleeve to the waste drain pipe; and inserting the fasteners through holes defined in the plumbing fixture and into the apertures of the arm portions of the flange, thereby connecting the first end portion of the sleeve to the plumbing fixture discharge.

16. The method of claim 15, wherein the fasteners are thread-forming fasteners, and the inserting fasteners comprises drilling the thread-forming fasteners into the apertures of the arm portions, such that threads are formed in the arm portions.

17. The flange apparatus of claim 1, wherein the first end portion comprises a ring protruding from a surface of the first end portion, the ring being operable to provide a seal between the flexible sleeve and the plumbing fixture.

18. The flange apparatus of claim 1, further comprising a gasket disposed on a top surface of the first end portion.

19. The flange apparatus of claim 11, wherein the first end portion comprises a ring protruding from a surface of the first end portion, the ring being operable to provide a seal between the flexible sleeve and the plumbing fixture.

20. The flange apparatus of claim 11, further comprising a gasket disposed on a top surface of the first end portion.

21. The method of claim 15, wherein the first end portion comprises a ring protruding from a surface of the first end portion, the ring being operable to provide a seal between the flexible sleeve and the plumbing fixture.

22. The method of claim 15, wherein the flange comprises a gasket disposed on a top surface of the first end portion.

23. The flange apparatus of claim 1, wherein the flexible sleeve is 4 inches or less in length.

24. The flange apparatus of claim 1, wherein each arm portion includes three apertures.

25. The flange apparatus of claim 1, wherein an outer surface of the sealing element tapers from a larger diameter distal to the second end portion of the flexible sleeve to a smaller diameter towards the second end portion of the flexible sleeve.

* * * * *